United States Patent
Dan et al.

(10) Patent No.: US 6,823,456 B1
(45) Date of Patent: Nov. 23, 2004

(54) SYSTEM AND METHOD FOR PROVIDING TRUSTED SERVICES VIA TRUSTED SERVER AGENTS

(75) Inventors: Asit Dan, Pleasantville, NY (US); Arun K. Iyengar, Yorktown Heights, NY (US); Manoj Kumar, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/382,248

(22) Filed: Aug. 25, 1999

(51) Int. Cl.⁷ .............................. H04L 9/00; H04L 9/32; G06F 11/30; G06F 12/14
(52) U.S. Cl. ..................... 713/178; 713/201; 380/246
(58) Field of Search ................................ 713/178, 191, 713/200, 201; 380/246

(56) References Cited

U.S. PATENT DOCUMENTS

| | | | | |
|---|---|---|---|---|
| 5,500,897 A | * | 3/1996 | Hartman, Jr. ................ | 713/178 |
| 6,009,177 A | * | 12/1999 | Sudia .......................... | 713/191 |
| 6,081,899 A | * | 6/2000 | Byrd ........................... | 713/201 |
| 6,125,186 A | * | 9/2000 | Saito et al. .................. | 380/287 |
| 6,188,766 B1 | * | 2/2001 | Kocher ........................ | 380/246 |
| 6,223,287 B1 | * | 4/2001 | Douglas et al. ............. | 713/178 |
| 6,510,513 B1 | * | 1/2003 | Danieli ........................ | 713/156 |
| 2001/0011350 A1 | * | 8/2001 | Zabetian ...................... | 713/176 |

* cited by examiner

Primary Examiner—Justin T. Darrow
Assistant Examiner—A. Nobahar
(74) Attorney, Agent, or Firm—F. Chau & Associates

(57) ABSTRACT

A client/server networking topology comprising a trusted server agent (TSA) (e.g., software application) that runs either at a client node or at a node in close proximity to the client and provides various trusted services to the client on behalf of a trusted server. In instances where the node in which the TSA software runs (i.e., the client or a node in close proximity) may be untrusted, and/or unreliable, methods are provided for making the TSA software running on the untrusted and/or unreliable node provide trusted and reliable services. In one aspect of the invention, a method for providing trusted service in a client/server system comprises the steps of: providing at least one client; providing at least one trusted server (TS); providing at least one trusted server agent (TSA) which is executing on or near the at least one client; providing a trusted service by the at least one TSA to the at least one client on behalf of the at least one TS.

21 Claims, 5 Drawing Sheets

SYSTEM AND METHOD FOR PROVIDING TRUSTED SERVICES VIA TRUSTED SERVER AGENTS

BACKGROUND

1. Technical Field

The present invention relates generally to a client/server networking system and, more particularly, to a system and method for providing trusted services using a trusted server agent (TSA) that provides various trusted services to the client on behalf of a trusted server.

2. Description of Related Art

In many applications, clients receive trusted and reliable services (e.g., time-stamping of a message, reliable delivery of a message) from a trusted third-party server. However, in many scenarios, there may be a significant delay in receiving such services due to either network congestion or server overload. In addition, the server may not always be accessible. Accordingly, a client/server networking system that can provide trusted services to clients which overcomes these problems is desirable.

SUMMARY OF THE INVENTION

The present invention is directed to a client/server networking topology comprising a trusted server agent (TSA) (e.g., software application) that runs either at a client node or at a node that is in close proximity to the client node to provide various trusted services to the client on behalf of a trusted server. Furthermore, in instances where the node in which the TSA software runs (i.e., the client or a node in close proximity) may be untrusted, and/or unreliable, the present invention provides methods for making the TSA software running on an untrusted and/or unreliable node provide trusted and reliable services.

In one aspect of the invention, a system for providing trusted services comprises: at least one trusted server (TS); at least one client; and at least one trusted server agent (TSA), wherein the at least one TSA provides trusted services to the at least one client on behalf of the at least one TS.

In another aspect of the present invention, the trusted service provided by a TSA is obtaining a trusted timestamp. The TSA may obtain a trusted timestamp from another entity in the network such as a TS or TSA. The remote entity may determine a reliable time based on its local clock, network clock, or through communication with other entities in the network other than the TSA requesting the trusted timestamp.

In still another aspect of the present invention, a TS may dynamically assign a plurality of remote trusted entities (such as TSs or TSAs) with which a particular TSA is to communicate with for providing trusted services.

In another aspect of the present invention, the trusted service provided by the TSA is reliable delivery of a message. The TSA may contact a remote entity in the network to request reliable deliver of a document or message in the event that the TSA is unable to deliver such document or message.

In yet another aspect of the present invention, the trusted service provided by the TSA is reliable delivery of a document or message with a trusted timestamp.

These and other aspects, features and advantages of the present invention will be described and become apparent from the following detailed description of preferred embodiments, which is to be read in connection with the accompanying drawings.

DETAILED DESCRIPTION OF PREFERRED EMBODIMENTS

Figure 1:
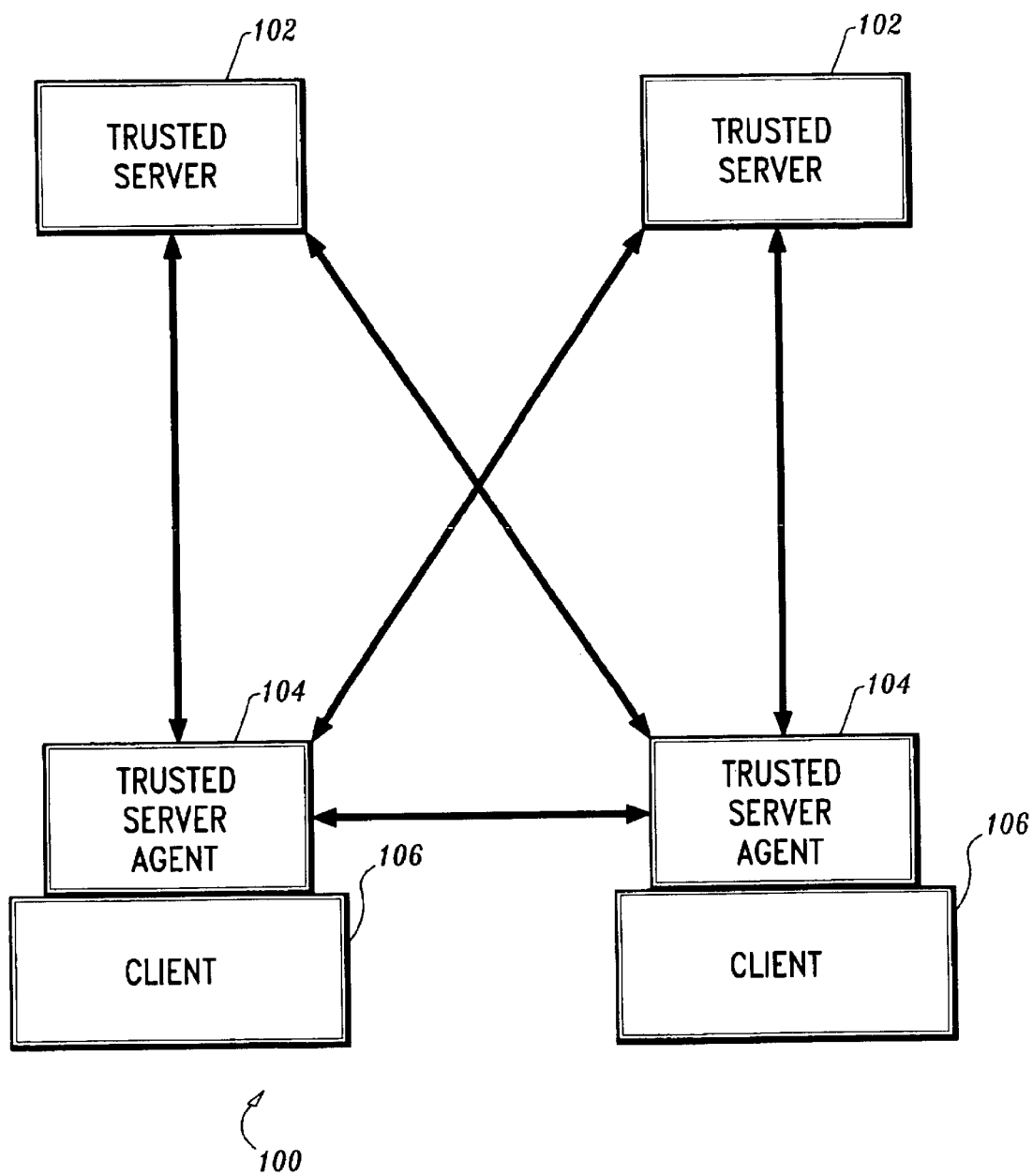
FIG. 1 is a block diagram of a client/server network architecture for providing trusted services in accordance with an embodiment of the present invention.

It is to be understood that elements of the present invention as depicted in FIG. 1, such as the TSAs, may be implemented in various forms of hardware, software, firmware, special purpose processors, or a combination thereof. Preferably, these elements are implemented in software as an application tangibly embodied on a program storage device such as a ROM, RAM and executable by any machine comprising suitable architecture such as one or more central processing units (CPU), a random access memory (RAM), and input/output (I/O) interface(s).

It is to be further understood that, because some of the constituent system elements (as well as method steps) depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

Referring now to FIG. 1, a block diagram illustrates a client/server system 100 for providing trusted services according to an embodiment of the present invention. The system 100 comprises one or more clients 106 with each client having a (local) trusted server agent (TSA) 104 associated therewith. The TSAs 104 are preferably embodied as program code (and possibly hardware) that is obtained from trusted third-parties. It is to be understood that although FIG. 1 depicts each TSA 104 residing (locally) on a client 106, a TSA 104 may actually reside at a network node that is in close proximity to its respective client 106. The trusted third-parties are represented by trusted servers (TS) 102. The trusted servers 102 are computers or applications with which the TSAs 104 have the ability to communicate with. It is to be understood that a single TS 102 (as depicted in FIG. 1) may represent either a single trusted third-party or multiple trusted third-parties.

It is to be further understood that a client 106 may have more than one TSA 104 associated therewith. For example, a client 106 could have one TSA 104 that represents a particular TS 102 and a second TSA 104 that represents another TS 102. In some cases, one TSA 104 may communicate directly with a remote TSA 104. Indeed, in situations where TSAs 104 can directly communicate with each other, even if the TS 102 is not reachable, a TSA 104 can provide trusted and reliable services by interacting with other TSAs 104.

Typically, a client 106 will access its local TSA 104 to request trusted and/or reliable service. A local TSA 104 may contact remote, but nearby, TSAs 104 or TSs 102 to receive such services. It is to be understood that a local TSA may not always be trusted since its corresponding client 106 may have the ability to alter the program code of the local TSA 104 (e.g., the local resources that a local TSA 104 depends on, such as reliable clock and persistent storage, cannot always be guaranteed).

In accordance with the present invention, therefore, a client 106 can achieve trust by verifying the actions of its local TSA 104 via one or more remote TSAs 104. This is because a client 106 often has less control over remote TSAs and, consequently, a remote TSA 104 can often be trusted. Similarly, a remote TSA 104 can act as backup on behalf of a local TSA for providing persistence, or to detect failures or large shifts in its local clock. To avoid potential collusion, a TS 102 may dynamically assign other TSAs 104 with which a specific TSA 104 should interact. In this situation, because the TSAs 104 are dynamically assigned, a client 106 has less opportunity for collusion. Trust can therefore be achieved by verifying the actions of a local TSA 104 (of a particular client 106) by other TSAs 104.

Each TSA 104 has the ability to reliably determine the time of day and there are several methods by which a TSA 104 can perform such a task. For example, a TSA 104 could rely on its local client's 106 clock. In many cases, however, this may not be sufficient to achieve reliable timestamping. Other more reliable methods for determining time can be used, such as the conventional time synchronization process known as NTP (Network Time Protocol) or receiving the NIST (national Institute of Standards and Technology) clock time broadcasts. In addition, a TSA 104 may contact one or more remote TS's 102 and/or one or more remote TSA's 104 in order to synchronize and/or verify its local clock with the clocks of these remote entities. It is to be appreciated that communication for synchronizing clocks may optionally be secured using, e.g., SSL (secure sockets layer). A TSA 104 may optionally have one or more cryptographic keys.

Figure 2:
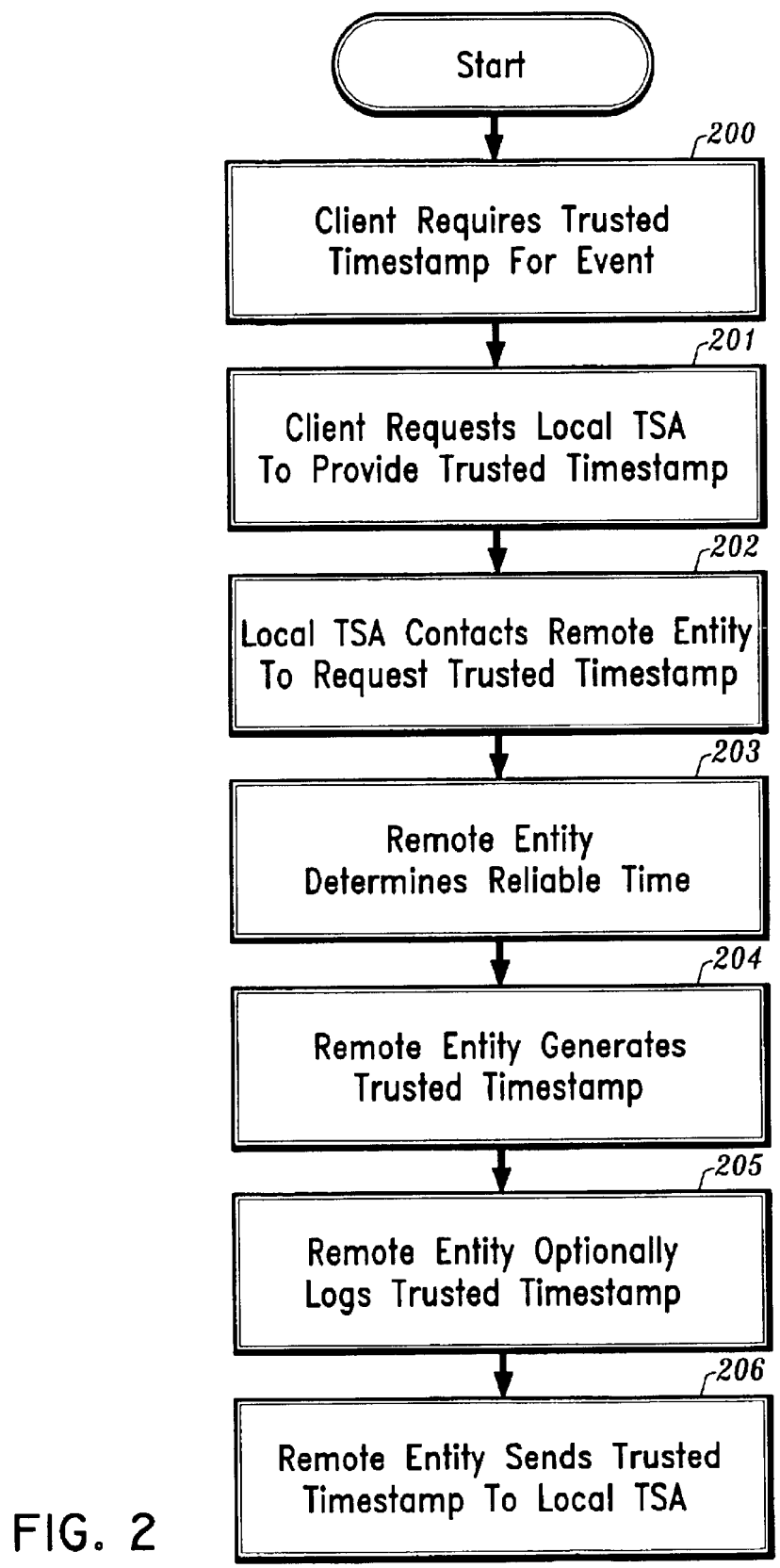
FIG. 2 is a flow diagram of method for providing trusted timestamping according to one aspect of the present invention.

Referring now to FIG. 2, a flow diagram illustrates a method for providing trusted timestamps in accordance with one aspect of the present invention. Initially, a client will decide that a trusted timestamp is needed for timestamping a certain event (step 200). The event could be one of various occurrence such as the creation or modification of a file, or if the client is to send a document or message to another entity in the network. The need for a trusted timestamp may arise from one of many situations. For example, the client may be sending a document to one or more other parties which require the document to have a trusted timestamp. In such instances, the client will contact its local TSA 104 (via an API (application program interface) call) to request the trusted service of providing a trusted timestamp (step 201). The local TSA 104, in turn, will then contact a remote entity in the network (e.g. a trusted server or another TSA) to request a trusted timestamp (step 202). It is to be understood that the local TSA cannot completely rely on its local client 106 clock for a reliable time or generate a trusted time stamp because the local client 106 may either maliciously manipulate its supporting services or have nonmalicious failure (s) of its supporting services.

The remote entity will then determine a reliable time to create an appropriate timestamp (step 203). Various methods for determining a reliable time (step 203) will now be described in further detail with reference to the flow diagram of FIG. 3. If the remote entity is another TSA (step 300), a reliable time can be determined in one of various manners. For instance, the TSA could rely on the clock of its local client (step 301). In some instances, however, this may not achieve a sufficiently reliable time (depending on the extent of the reliability required). Alternatively, a reliable time can be determined from the network clock (e.g., NTP or NIST time broadcasts as described above) (step 302).

Another option is that the TSA may communicate with one or more remote TSA's (other than the local TSA requesting the timestamp) currently assigned to the TSA to determine a reliable time (step 303). It is to be appreciated that the communication between the TSA's may be secure and authenticated. The time may be determined by, e.g., averaging the time of all the TSA's in communication, taking a majority vote, or synchronizing and/or verifying the TSA's local clock with the clocks of the dynamically assigned remote TSAs. For dynamic assignment of TSAs, one or more TS's may be in constant communication with the TSA so as to provide updated lists of particular TSAs that are to be contacted for determining times. It is to be understood that the number of TSA's needed (dynamically assigned) for determining a time is dependent on various factors including, but not limited to, the extent of reliability of the TSAs, the required accuracy for the time, and the amount of TSAs in geographic proximity to the local TSA.

On the other hand, if the remote entity (requested in step 202) is a trusted server (step 304), a reliable time may be determined directly from the local clock of the trusted server.

In any event, referring again to FIG. 2, once the remote entity (TSA or TS) determines a reliable time (step 203), a trusted timestamp will be generated (step 204). The TSA may generate the trusted timestamp by hashing the reliable time (and other timestamp content) and digitally signing the hashed timestamp. Techniques for providing digital signatures are disclosed in "Applied Cryptography" by Bruce Schneider, 2nd ed., John Wiley and Sons, 1996. Advantageously, because the local TSA is precluded from participating in determining the reliable time and creating the timestamp, additional reliability is provided by preventing the client from forging timestamps by corrupting its local TSA. It is to be appreciated that the trusted timestamp can subsequently be examined for authenticity and to verify the remote entity (e.g., TSA or TS) which created it by examining the digital signature using conventional cryptographic techniques as described in "Schneider".

Next, the remote entity that generated the trusted timestamp may optionally log (persistence store) to keep track or remember the trusted timestamp (step 205). The remote entity will send the trusted timestamp to the local TSA that requested the trusted timestamp (step 206). The local TSA may then transmit the trusted timestamp to the client or any other entity in the network which may have requested such timestamp. It is to be understood that the communication between the local TSA 104 and the entity may be secured. The entity receiving information from the local TSA 104 may send an acknowledgement (optionally secured) back to the local TSA.

Figure 3:
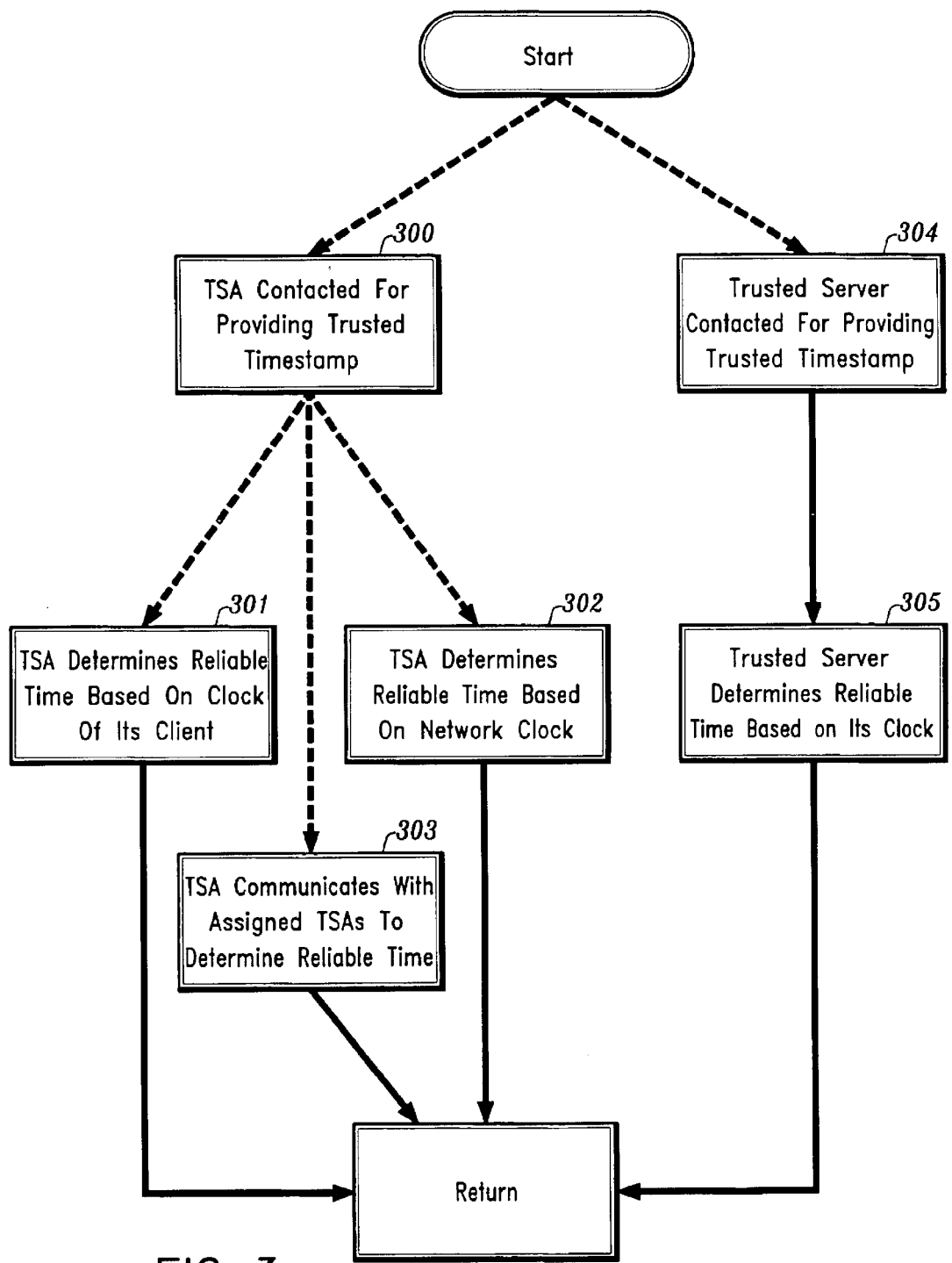
FIG. 3 is a flow diagram illustrating methods for determining a reliable time for a trusted timestamp according to one aspect of the present invention.

It is to be appreciated that there are a number of variations on the process depicted in FIGS. 2 and 3. For example, one skilled in the art could adapt this approach to use the system for determining other parameters in addition to the time of day, such as response times in a computer network. Another variation would be for a plurality of trusted servers to participate in determining the time of day (i.e., the TSA could communicate with assigned TS's to determine a reliable time).

In accordance with another aspect of the present invention, trusted services can be achieved by allowing one or more TSA to replicate the actions of a local TSA. By way of example, a client running on an unreliable node can obtain guaranteed message delivery service from its local TSA where the TSA backs up its commitments in other TSAs. Therefore, if the local node and hence, its TSA fails, one or more of the backup TSAs (of the local TSA) can detect this failure and then act on their commitments to the failed local TSA, e.g., reliable delivery of the backed up messages.

Figure 4:
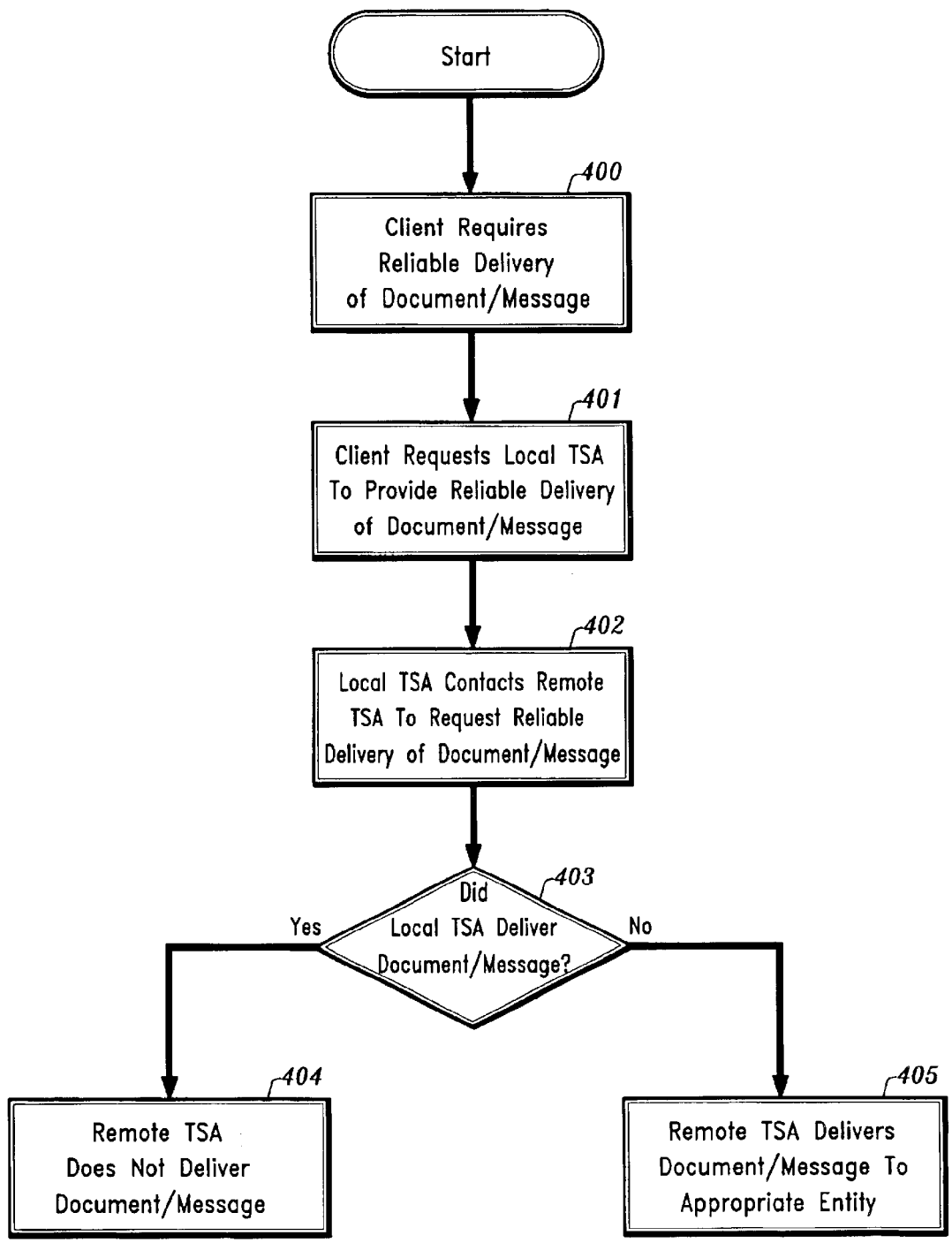
FIG. 4 is a flow diagram of a method for providing reliable delivery of a document according to one aspect of the present invention.

Referring now to FIG. 4, a flow diagram illustrates a method for providing reliable delivery of a document or message according to one aspect of the present invention. Initially, a client will decide that a trusted service of reliable delivery of a document or message is needed (step 400). The client will contact its local TSA and request such service (step 401). The local TSA will contact another TSA (remote TSA) to request such service and provide a copy of the document or message to the TSA (step 402) so that both the local TSA and the remote TSA have a copy of the document/message to be delivered. It is to be understood that a plurality of remote entities may be contacted by the local TSA to provide reliable delivery. The local TSA will attempt to deliver the document or message. If, for some reason, the local TSA fails to deliver the document/message (negative result in step 403), the remote TSA will deliver the document/message (step 405). The local TSA may not be able to deliver the document/message due to, e.g., system failure or network congestion. If the local TSA does deliver the message (affirmative result in step 403), the remote TSA will not deliver the document/message (step 404). The remote TSA can determine whether the local TSA has delivered the document/message in one of various manners. For instance, the local TSA can notify the remote TSA that it was able to successfully deliver the document/message. In addition, the remote TSA can periodically contact the local TSA to determine if the document/message has been delivered. If, for instance, communication can not be established with the local TSA due to system failure, or if the local TSA has not been able to deliver the document/message within a certain time frame, the remote TSA can deliver the document/message on behalf of the local TSA.

In some instances, a client will require reliable delivery of document/message with a trusted timestamp. For example, with regard to Internet auctions, the client may have to submit a particular bid before a certain deadline. If there is a network failure or the entity receiving the bids is not reachable by a local TSA for some reason, the client may require reliable delivery of bid with a trusted time stamp to ensure that such bid is delivered with a trusted timestamp or that such bid was submitted at the required time despite the fact that it was not actually delivered.

Figure 5:
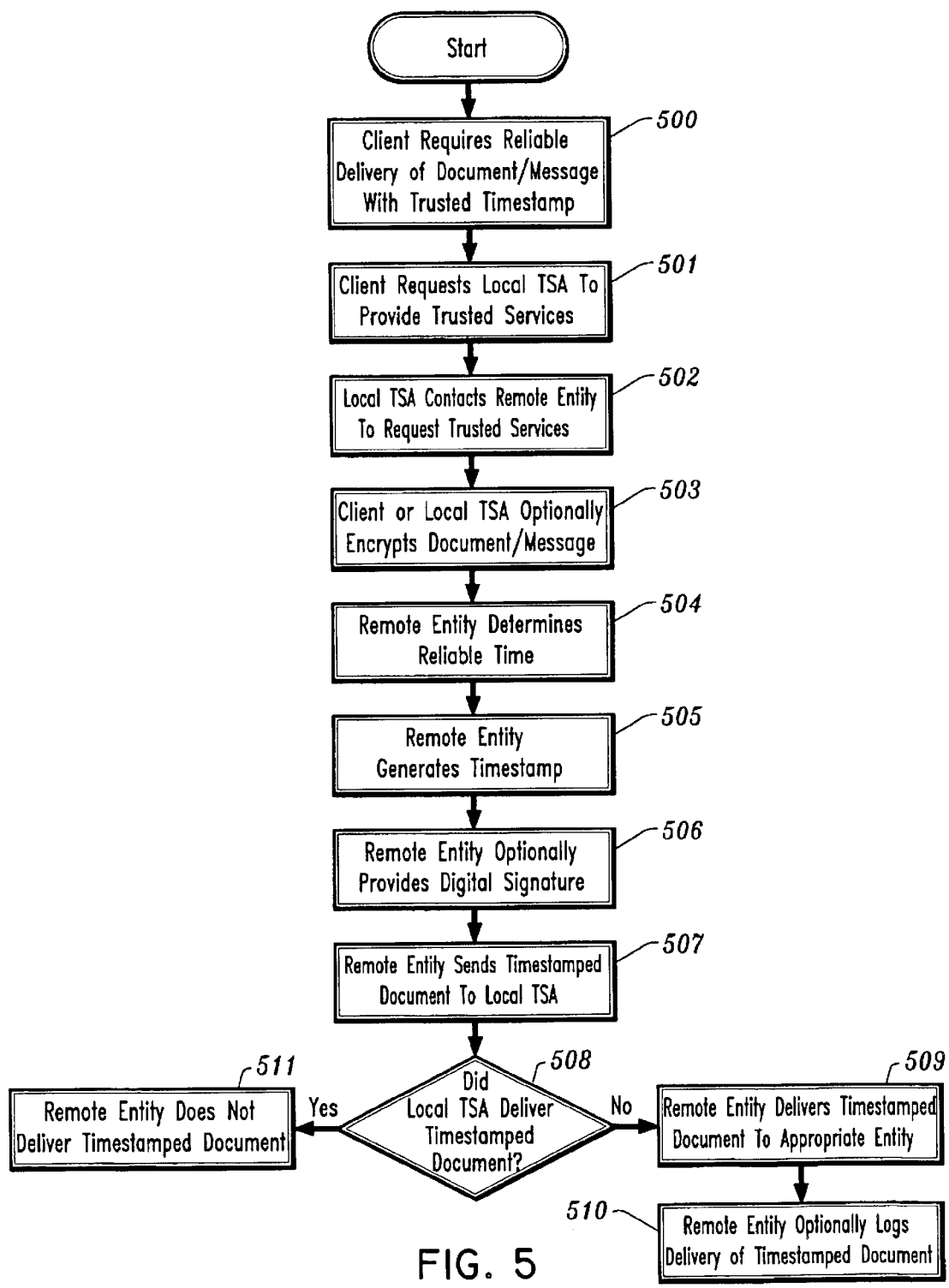
FIG. 5 is a flow diagram of a method for providing reliable delivery of a trusted timestamped document according to one aspect of the present invention.

Referring now to FIG. 5, a flow diagram illustrates a method for providing reliable delivery of a trusted timestamped document according to one aspect of the present invention. Initially, a client 106 determines that it requires the trusted service of reliable delivery of a document with a trusted time stamp (step 500) and contacts its local TSA to provide such service (step 501). The local TSA will then contact a remote entity (e.g., TSA or TS) to request such service and sends a copy of the document/message to such entity (step 502). Before the document/message is sent, either the client or local TSA may optionally encrypt the document/message (step 503).

Next, the remote entity will determine a reliable time to generate a timestamp (step 504). It is to be understood that the process for determining a reliable time is similar to the method described above with reference to FIG. 3. When the reliable time is determined, the remote entity will generate a trusted timestamp and then append the trusted timestamp to the document/message (step 505). The remote entity may (optionally) generate a digital signature by hashing the timestamped document and then encrypting the hashed document using a private key (step 506). The remote entity will then send a copy of the timestamped document (as well as the digital signature if it was generated) to the local TSA (507) for delivery (if possible) by the local TSA. If, for some reason, the local TSA fails to deliver the timestamped document (negative result in step 508), the remote entity will deliver the timestamped document (step 509) and then optionally log such delivery (step 510). As explained above, the local TSA may not be able to deliver the timestamped document due to, e.g., system failure or network congestion. If the local TSA delivers the timestamped document (affirmative result in step 508), the remote entity will not deliver its copy (step 511). Again, the remote entity can determine whether the local TSA has delivered the timestamped document, for instance, by notification from the local TSA or by periodically contacting the local TSA to determine if the timestamped document has been delivered.

It is to be understood that the timestamped document may be delivered (by the remote entity or local TSA) to one or more entities in the network and/or the client. It is to be further understood that communications with such entities to which the timestamped document are sent may be secured. In addition, the one or more of the entities receiving the timestamped document may send acknowledgement messages to the local TSA 104 or remote entity from which it was delivered. Such acknowledgments may include timestamps (trusted or otherwise) that indicate the time at which the timestamped document was received by the respective entity. Moreover, these acknowledgement messages may be securely sent.

Although illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for providing trusted service in a client/server network, the method comprising the steps of:

providing at least one client;

providing at least one trusted server (TS);

providing at least one trusted server agent (TSA) which executes either on or near the at least one client, and which provides a trusted service on behalf of the at least one TS;

the at least one client requesting the at least one TSA to provide a trusted service, wherein the trusted service is providing a trusted timestamp;

the at least one TSA communicating with at least one trusted entity in the network to request a trusted timestamp, wherein the at least one trusted entity is another TS or another TSA;

in response to the request, the at least one trusted entity determining a reliable time, generating a trusted timestamp using the reliable time, and sending the trusted timestamp to the at least one TSA.

2. The method of claim 1, further comprising the at least one trusted entity digitally signing the trusted timestamp.

3. The method of claim 1, wherein determining a reliable time comprises using a local clock of the at least one trusted entity, using a network clock, or communicating with at least one additional trusted entity to agree on the reliable time.

4. The method of claim 3, wherein communicating with at least one additional trusted entity to agree on the reliable time comprises synchronizing a local clock of the at least one trusted entity with a local clock of the at least one additional trusted entity.

5. The method of claim 1, further comprising dynamically assigning at least one trusted entity in the network with which the at least one TSA communicates to provide the trusted service.

6. A method for providing trusted service in a client/server network, the method comprising the steps of:

providing at least one client;

providing at least one trusted server (TS);

providing at least one trusted server agent (TSA) which executes either on or near the at least one client;

the at least one client requesting the at least one TSA to provide a trusted service on behalf of the at least one TS, wherein the trusted service is providing reliable delivery of a document;

the at least one TSA communicating with at least one trusted entity in the network to request reliable delivery of the document; and in response to the request, the at least one trusted entity receiving a copy of the document from the at least one TSA, determining if the at least one TSA is able to deliver the document, and delivering the document on behalf of the at least one TSA if the at least one TSA is unable to deliver the document.

7. The method of claim 6, wherein providing reliable delivery of a document comprises providing reliable delivery of a document with a trusted timestamp, and the method further comprising:

the at least one trusted entity determining a reliable time, generating a trusted timestamp using the determined reliable time, appending the trusted timestamp to the document, and sending the trusted timestamped document to the at least one TSA, wherein delivering the document comprises delivering the trusted timestamped document by the at least one trusted entity if the at least one TSA is unable to deliver the trusted timestamped document.

8. A program storage device readable by a machine, tangibly embodying a program of instructions executable by the machine to perform method steps for providing trusted services by a trusted server agent (TSA) in a client/server network system, the method steps comprising:

receiving by the TSA a request from a client to provide a trusted service, wherein the TSA provides a trusted service on behalf of a trusted server (TS) associated with the TSA, wherein the trusted service comprises (i) providing a trusted timestamp (ii) providing reliable delivery of a document or (ii) providing reliable delivery of a document with a trusted timestamp;

the TSA communicating with at least one other trusted entity in the network to provide the requested trusted service, wherein the at least one other trusted entity is one of a trusted server and a second TSA; and the TSA obtaining the trusted service from the at least one other trusted entity.

9. A method for providing trusted services in a client/server network system, comprising the steps of:

a trusted entity receiving a request from a trusted server agent (TSA) in the network for providing a trusted service, wherein the trusted entity is a trusted server (TS) or another TSA, wherein the trusted service is providing a trusted timestamp; and in response to the request, the trusted entity determining a reliable time, generating a trusted timestamp using the reliable time, and sending the trusted timestamp to the TSA, wherein determining a reliable time comprises communicating with at least one additional trusted entity to agree on the reliable time.

10. The method of claim 9, wherein communicating with at least one additional trusted entity to agree on the reliable time comprises synchronizing a local clock of the at least one trusted entity with a local clock of the at least one additional trusted entity.

11. The method of claim 9, further comprising the trusted entity digitally signing the trusted timestamp.

12. The method of claim 9, further comprising dynamically assigning the trusted entity in the network with which the TSA communicates to request the trusted service.

13. A program storage device readable by a machine, tangibly embodying a program of instructions that are executable by the machine to perform the method steps of claim 9.

14. A method for providing trusted services in a client/server network system, comprising the steps of:

a trusted entity receiving a request from a trusted server agent (TSA) in the network for providing a trusted service, wherein the trusted entity is a trusted server (TS) or another TSA, wherein the trusted service is providing reliable delivery of a document; and in response to the request, the trusted entity receiving a copy of the document from the TSA, determining if the TSA is able to deliver the document, and delivering the document on behalf of the TSA if it is determined that the TSA is unable to deliver the document.

15. The method of claim 14, wherein providing reliable delivery of a document comprises providing reliable delivery of a document with a trusted timestamp.

16. The method of claim 15, further comprising:

in response to the request, the trusted entity determining a reliable time, generating a trusted timestamp using the determined reliable time, appending the trusted timestamp to the document, and sending the trusted timestamped document to the TSA, wherein delivering the document comprises delivering the trusted timestamped document on behalf of the TSA if it is determined that the TSA is unable to deliver the trusted timestamped document.

17. The method of claim 16, wherein determining a reliable time comprises using a local clock of the trusted entity, using a network clock, or communicating with at least one additional trusted entity to agree on the reliable time.

18. The method of claim 17, wherein communicating with at least one additional trusted entity to agree on the reliable time comprises synchronizing a local clock of the at least one trusted entity with a local clock of the at least one additional trusted entity.

19. The method of claim 16, further comprising the trusted entity digitally signing the trusted timestamped document.

20. The method of claim 14, further comprising dynamically assigning the trusted entity in the network with which the TSA communicates to request the trusted service.

21. A program storage device readable by a machine, tangibly embodying a program of instructions that are executable by the machine to perform the method steps of claim 14.

* * * * *